United States Patent Office 3,450,545
Patented June 17, 1969

3,450,545
NOBLE METAL METALIZING COMPOSITIONS
Kermit H. Ballard, Hockessin, and Lewis C. Hoffman, Wilmington, Del., assignors to E. I. du Pont de Nemours and Company, Wilmington, Del., a corporation of Delaware
No Drawing. Filed May 31, 1966, Ser. No. 553,719
Int. Cl. C09j *1/00;* C09d *5/10*
U.S. Cl. 106—1        12 Claims

ABSTRACT OF THE DISCLOSURE

Noble metal compositions containing an inorganic binder and a finely divided oxide precursor, e.g., Ru, Ir, Rh, Cu, Si, SiC, BN. These metalizing compositions yield fired coatings having improved joint strengths and improved resistance to fissuring.

---

Noble metal compositions comprising a blend or mixture of an inorganic binder powder and a noble metal powder are used to prepare fired-on conductor coatings, i.e., metalizings, for various electronic uses. The predominating component of such compositions is the noble metal powder which generally is a silver, palladium, gold or platinum powder, or a mixture of two or more such powders, e.g., a palladium-silver, palladium-gold or platinum-gold powder mixture. The binder component is usually a powdered glass, e.g., a metal borosilicate glass. In use, the composition is generally dispersed in an inert liquid vehicle to provide a metalizing ink of desired consistency. Such inks are applied to the ceramic substrate, e.g., by screen stencilling, in the desired pattern and the pattern is then fired to produce the metalizing on the substrate.

The joint strengths of metalizings from such prior noble metal metalizing compositions range from about 1200 p.s.i. where the metal phase is a mixture of platinum and gold, to about 3200 p.s.i. where the metal is silver. Palladium-gold, palladium and palladium-silver compositions give fired coatings having joint strengths intermediate to the above values. Such joint strengths are much lower than generally desired, particularly for the metalizings from prior platinum-gold and palladium-gold metalizing compositions. A further undesirable characteristic of such prior compositions is the tendency of the metalizings resulting from their use to fissure. Fissuring may sometimes even be so severe as to disrupt current flow through the metalizing. There is a real need for noble metal metalizing compositions which would overcome or substantially reduce the deficiencies of prior compositions in the above respects.

The metalizing compositions of the invention comprise intimate mixtures, on a weight basis, of: (A) about 60 to 95%, preferably 75–90%, of at least one noble metal powder from the group consisting of silver, palladium, platinum and gold powders; (B) 4 to 35%, preferably 9 to 20%, of an inorganic binder powder; and (C) 0.1 to 7%, preferably 0.5 to 3%, of at least one oxide precursor additive in powder form from the group consisting of rhodium, iridium, ruthenium, copper, silicon carbide and boron nitride.

The presence of the oxide precursor additive, component (C) above, has been found to improve significantly the joint strengths of the metalizings resulting when coatings of the compositions are fired on a ceramic substrate. Such additive also generally prevents or greatly inhibits fissuring of the metalizing. These advantages resulting from the presence of the oxide precursors are most pronounced in those metalizing compositions of the above type whose metal components are combinations of gold and platinum or gold and palladium. The present gold-platinum and gold-palladium compositions constitute a preferred group of metalizing compositions, since they give metalizings having much higher joint strengths and substantially less tendency towards fissuring than metalizings from prior gold-platinum and gold-palladium metalizing compositions. The most preferred compositions of the invention are those in which the metal components consist essentially of from 75 to 90% gold and 10 to 25% platinum, or from 70 to 90% gold and from 10 to 30% palladium.

As is customary for metalizing compositions of this general type, they usually are applied to the ceramic substrates in the form of dispersions, commonly referred to as inks, in inert organic vehicles. The firing of patterns of such inks on the substrates is usually effected in air at a temperature which is sufficiently high to melt the inorganic binder component but insufficiently high to melt either the metal component or the substrate. All volatiles and organic materials are removed or burned off during the firing and the inorganic binder component melts, and bonds the metal component to the substrate. Adhesion of the resulting metalizing to the substrate depends on the wetting of the substrate by the molten inorganic binder, and the degree of wetting determines the force by which the metalizing is held to the substrate. Although this force may be high, the joint strength of the fired metalizing coating may still be low if the cohesiveness of the coating is poor. It has now been discovered that the joint strengths of such metalizings can be increased substantially by having present in the metalizing compositions from which the metalizings are derived a suitable amount of at least one oxide precursor of the group consisting of rhodium, iridium, ruthenium, copper, silicon, silicon carbide and boron nitride.

The oxide precursors become at least partially oxidized during the firing of the composition in air to give oxide particles having relatively low thermal expansions compared to the thermal expansions of the inorganic binder component which generally comprises a metal silicate or borate glass. Such oxide particles are dispersed throughout the binder phase and appear to form an interrupted oxide coating on the metal particles which are also dispersed. The oxide coating is thought to inhibit sintering together of the metal particles and the withdrawal of the sintered metal particles from the binder or glass phase, a phenomenon which results in fissuring. The interrupted oxide coatings on the metal particles are thought to increase the forces of adhesion between the metal particles and the continuous glass phase, thus increasing the cohesiveness of the metalizing. Whether or not this be the explanation, it has been found that the presence of the above oxide precursors in the original metalizing compositions results in fired metalizings having substantially increased joint strengths and, generally, improved resistance to fissuring.

The oxide precursor should be finely divided and intimately mixed with the metal and binder components. The oxide precursor should be of a particle size of from 0.05 to 44 microns in diameter with at least 80% of the particles within the range of about 0.05 to 5 microns. Coarser material usually results in no significant improvement in the joint strength of the metalizing. On the other hand, the presence of a substantial amount of oxide precursor particles of a size less than about 0.05 micron is disadvantageous because such small particle size material makes soldering of the metalizing difficult. When using oxide precursor powder of particle size of 0.05 to 44 microns with at least 80% of the particles in the 0.05 to 5 micron range, amounts thereof from about 0.1 to 7% based on the total weight of the metalizing composition should be used. Smaller amounts generally do not result in any significant improvement in the properties of the metalizing while larger amounts result in no added improvement beyond that achieved by using amounts within the stated range. The preferred amounts range from about 0.5 to 3%.

The metal and inorganic binder components of the present composition should also be in their usual finely divided or powder forms. Their particle sizes should generally not exceed about 44 microns. Particle sizes of from about 0.1 to 10 microns are distinctly preferred and, particularly for the metal powders, particle sizes of from 0.1 to 5 microns are most preferred.

The inorganic binder component of the present metalizing compositions may be any of the binders previously proposed or used in metalizing compositions of this general type. Such binders generally are glass frits or combinations thereof with a wetting agent such as $Bi_2O_3$. Examples of suitable frits are those of the lead borate, lead borosilicate, lead-bismuth borosilicate, lead fluoborate, cadmium borate and alkali metalcadmium borate and borosilicate types.

The vehicle in which the metalizing composition is dispersed in forming inks or pastes for application to ceramic substrates can be any of the vehicles of the types which have heretofore been proposed or used for corresponding metalizing compositions. These include, but are not restricted to, solutions of a polymethacrylate of a lower alcohol, or of ethyl cellulose, in a solvent such as beta-terpineol, diethylene glycol monobutyl ether, diethylene glycol butyl ether acetate, ethylene glycol monobutyl ether and ethylene glycol butyl ether acetate. The proportions of metalizing composition and vehicle employed in preparing the inks are not critical and may be varied considerably depending upon the ink fluidity desired. Generally from about 2 to 10 parts of the composition per 1 part of the vehicle will be used.

The effectiveness of the present oxide precursor additives in increasing the joint strengths of metalizings derived from various metalizing compositions is shown in Table I. Examples 1–5 below show the formulations of the metalizing compositions used in preparing the metalizings whose joint strengths are reported in Table I.

TABLE I.—JOINT STRENGTHS OF METALIZINGS (P.S.I.)

| Additive | Pt-Au (Ex. 1) | Pd-Au (Ex. 2) | Pd (Ex. 3) | Pd-Ag (Ex. 4) | Ag (Ex. 5) |
| --- | --- | --- | --- | --- | --- |
| None (control) | 1,200 | 1,800 | 2,400 | 2,800 | 3,200 |
| Cu | 2,600 | 2,800 | 3,100 | 3,400 | 3,720 |
| Si | 2,400 | 2,500 | 3,200 | 3,650 | 3,515 |
| Rh | 2,800 | 3,000 | 3,700 | 3,450 | 3,842 |
| Ir | 1,865 | 2,900 | 2,800 | 3,275 | 4,100 |
| SiC | 2,460 | 3,100 | 3,200 | 3,200 | 4,300 |
| Ru | 2,400 | 3,600 | 3,400 | 3,815 | 3,875 |
| BN | 1,800 | 3,200 | 2,675 | 3,750 | 3,460 |

In obtaining the joint strengths reported in the above table, the various metalizing compositions were dispersed in a vehicle which was an 8% solution of ethyl cellulose in beta-terpineol to provide inks, each of which was then applied via a stencil screen onto an alumina substrate to give a circular printed area 1 cm. in diameter on the substrate. On a weight basis, about 3–4 parts of the metalizing composition were used per 1 part of the vehicle in preparing the inks. The printed substrates were then fired in air in the usual manner; the firing temperature and time for those whose prints contained silver were 750° C. and 10 minutes, and the firing temperature and time for the remainder of the prints were 1050° C. and 2 minutes. A tinned copper wire 20 mils in diameter and 6 cm. long was then soldered onto each circular metalizing parallel to the surface thereof so as to leave a 5 cm. tail of the wire which was bent at right angle to the surface of the metalizing. Soldering was effected in all cases at 205–220° C. using a solder containing 67% tin and 33% lead. The joint strength, calculated in pounds per square inch (p.s.i.), was then determined by pulling the wire at right angle to the surface of the metalizing and measuring the amount of pull required to separate the joint.

Each control metalizing indicated in Table I was prepared in exactly the same way as were the indicated other corresponding metalizings except that none of the additives of the invention was included in the compositions used. By comparing the control values with the others reported, it will be seen that each of the additives increased substantially the joint strengths of each of the five types of metalizings. The improvements respecting the Pt-Au and Pd-Au metalizings are particularly significant since metalizings of these types, without the additives of the invention, exhibit characteristically poor joint strengths. Even though the Pd, Pd-Ag and Ag types of metalizings exhibit quite good joint strengths in the absence of any of the additives, the data in the table clearly show that use of the present additives in such metalizings increases substantially their joint strengths.

In the following examples and elsewhere herein, all proportions of materials expressed as percentages or parts are by weight unless stated to be otherwise.

Examples 1–5 set forth the basic formulations of the metalizing compositions of the invention used in preparing the metalizings indicated in Table I. In each of these examples, seven metalizing compositions were prepared, each containing one of the 7 additives shown in Table I; and an eighth composition similar to the other seven except that it was free of any such additive and contained in its place an equal amount of $Bi_2O_3$, was also prepared. All of the frit and $Bi_2O_2$ components had particle sizes in the range 0.1–10 microns, and the frit used in each example was a sodium-cadmium borosilicate frit composed of 63.1% CdO, 7.3% $Na_2O$, 16.9% $B_2O_3$ and 12.7% $SiO_2$. All of the additives employed were essentially free of particles of a size greater than about 10 microns with at least 80% of the particles being of a size of from 0.1 to 5 microns.

EXAMPLE 1

Platinum-gold compositions:

| | Percent |
| --- | --- |
| Gold powder | 67.1 |
| Platinum powder | 18.3 |
| Frit | 2.7 |
| $Bi_2O_3$ | 10.9 |
| Additive | 1.0 |
| | 100.0 |

The average particle sizes of the gold and platinum powders, respectively, were 3 microns and 0.2 micron and both were essentially free of particles greater in size than about 5 microns.

EXAMPLE 2

Palladium-gold compositions:

| | Percent |
| --- | --- |
| Gold powder | 75.0 |
| Palladium powder | 10.0 |
| Frit | 3.0 |
| $Bi_2O_3$ | 10.7 |
| Additive | 1.3 |
| | 100.0 |

The palladium powder had an average particle size of about 5 microns and was essentially free of particles greater in size than about 10 microns. The gold powder was the same as that used in Example 1.

EXAMPLE 3

Palladium compositions:

| | Percent |
| --- | --- |
| Palladium powder | 86.1 |
| Frit | 8.0 |
| $Bi_2O_3$ | 4.8 |
| Additive | 1.1 |
| | 100.0 |

The palladium powder was the same as that used in Example 2.

EXAMPLE 4

| Palladium-silver compositions: | Percent |
|---|---|
| Palladium powder | 30.0 |
| Silver powder | 54.7 |
| Frit | 3.1 |
| $Bi_2O_3$ | 10.8 |
| Additive | 1.4 |
| | 100.0 |

The palladium powder was the same as that used in Example 2. The silver powder had an average particle size of 0.2 micron and was essentially free of particles greater in size than about 5 microns.

EXAMPLE 5

| Silver compositions: | Percent |
|---|---|
| Silver powder | 85.4 |
| Frit | 4.9 |
| $Bi_2O_3$ | 8.5 |
| Additive | 1.2 |
| | 100.0 |

The silver powder was the same as that used in Example 4.

EXAMPLE 6

Platinum-gold metalizing compositions generally similar to those of Example 1 were prepared, except that they contained 67.7% of the gold powder, 18.5% of the platinum powder, 2.8% of the glass frit powder, 10% of $Bi_2O_3$ and 1% oxide precursor additive. Seven such compositions were prepared, each containing one of the oxide precursor additives indicated in Table I. Inks prepared by dispersing 4 parts of each composition in 1 part of a vehicle which was an 8% solution of ethyl cellulose in beta-terpineol, were printed by screen-stencilling onto alumina substrates and the prints were fired in air as indicated above. The resulting metalizings were inspected for fissuring. Those resulting from compositions containing Rh, SiC, Ir or Ru as the additive were essentially free of fissures. Those prepared from compositions containing Cu, Si or BN tended to fissure slightly but their tendency toward fissuring was markedly less than when no such additive was used.

Generally similar results were obtained when 1% of each of the above additives were employed in platinum-gold metalizing compositions similar to those of Example 6 except that the proportions of the components other than the additive were varied over the following ranges:

| | Range, Percent |
|---|---|
| Gold powder | 55–70 |
| Platinum powder | 16–20 |
| Au+Pt | 70–90 |
| Frit | 2–6 |
| $Bi_2O_3$ | 7–23 |

EXAMPLE 7

Palladium-gold metalizing compositions generally similar to those of Example 2 were prepared, except that each of the oxide precursors indicated in Table I was employed in amounts equal to 1% of the composition weight and the proportions of the other components were varied over the following ranges:

| | Range, Percent |
|---|---|
| Gold powder | 60–80 |
| Palladium powder | 8–25 |
| Au+Pd | 70–90 |
| Frit | 2–6 |
| $Bi_2O_3$ | 7–23 |

All of the metalizings on alumina substrates resulting from such compositions exhibited joint strengths similar to those reported for the Pd-Au metalizings of Table I. Furthermore, the metalizings from compositions containing Rh, SiC, Ir and Ru as additives were essentially free of fissures while those from compositions containing Cu, Si and BN showed much less tendency to fissure than do metalizings from corresponding compositions containing no such additive.

EXAMPLE 8

Each of the seven additives indicated in Table I were used in palladium-gold compositions of the following formulations, in which the frit was a lead fluoborate frit (65% PbO, 15% $PbF_2$ and 20% $B_2O_3$):

| | A | B |
|---|---|---|
| Gold powder, percent | 71.0 | 71 |
| Palladium powder, percent | 13.0 | 13 |
| Frit, percent | 12.2 | 9 |
| $Bi_2O_3$, percent | 2.8 | 2 |
| Additive, percent | 1.0 | 5 |
| | 100.0 | 100 |

All of the metalizings on alumina substrates resulting from such compositions were similar to those reported for Example 7.

The embodiments of the invention in which an exclusive property or privilege is claimed are as follows:

1. A metalizing composition comprising an intimate mixture, on a weight basis, of: (A) about 60 to 95% of at least one noble metal powder from the group consisting of silver, palladium, platinum and gold powders; (B) 4 to 35% of an inorganic binder comprising glass frits; and (C) 0.1 to 7% of at least one finely divided oxide precursor from the group consisting of rhodium, iridium, ruthenium, copper, silicon, silicon carbide and boron nitride, said oxide precursor having a particle size ranging from 0.05 to 44 microns, with at least 80% of the particles being in the 0.05 to 5 microns range.

2. A composition according to claim 1 wherein component (A) consists essentially of 75 to 90% gold powder and 10 to 25% platinum powder.

3. A composition according to claim 1 wherein component (A) consists essentially of from 70–90% gold powder and 10–30% palladium powder.

4. A composition according to claim 1 wherein component (C) is rhodium.

5. A composition according to claim 1 wherein component (C) is silicon carbide.

6. A composition according to claim 1 wherein component (C) is iridium.

7. A composition according to claim 1 wherein component (C) is ruthenium.

8. A composition according to claim 2 wherein component (C) is rhodium.

9. A composition according to claim 3 wherein component (C) is rhodium.

10. A composition according to claim 1 dispersed in an inert liquid organic vehicle.

11. A composition according to claim 2 dispersed in an inert liquid organic vehicle.

12. A composition according to claim 3 dispersed in an inert liquid organic vehicle.

References Cited

UNITED STATES PATENTS 3,293,501    12/1966    Martin ———————— 252—514 XR

JULIUS FROME, *Primary Examiner.*

L. HAYES, *Assistant Examiner.*

U.S. Cl. X.R.

106—193; 117—123, 227, 229; 252—514